(12) United States Patent
Mosley et al.

(10) Patent No.: US 6,501,251 B1
(45) Date of Patent: Dec. 31, 2002

(54) SUPPLY VOLTAGE REGULATION SYSTEM FOR TRANSMISSION LINES

(75) Inventors: Larry Eugene Mosley, Sunnyvale, CA (US); Edward R. Stanford, Dupont, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/971,258

(22) Filed: Oct. 4, 2001

(51) Int. Cl.[7] .............................................. G05F 1/59
(52) U.S. Cl. ...................................................... 323/273
(58) Field of Search ............................................ 323/273

(56) References Cited

U.S. PATENT DOCUMENTS 5,821,813 A * 10/1998 Batchelor et al. ............ 330/277
6,114,923 A *  9/2000 Mizutani ...................... 333/103

* cited by examiner

*Primary Examiner*—Jeffrey Sterrett
(74) *Attorney, Agent, or Firm*—Trop, Pruner & Hu, P.C.

(57) ABSTRACT

A system includes a junction-field-effect transistor and a transmission line. The transmission line is coupled to the transistor to communicate a supply voltage from a first end of the transmission line to a first circuit located near a second end of the transmission line. The system also includes a second circuit to control operation of the transistor to regulate a decrease in the supply voltage between the first end of the transmission and the first circuit.

21 Claims, 4 Drawing Sheets

SUPPLY VOLTAGE REGULATION SYSTEM FOR TRANSMISSION LINES

BACKGROUND

The invention generally relates to a supply voltage regulation system,

A typical computer system may include a supply voltage delivery system, such as a voltage regulation system 5 that is depicted in FIG. 1, for purposes of communicating a supply voltage to power consuming circuitry of the computer system. As an example, this power consuming circuitry may be distributed throughout the system on various dies that form the components of the system. More particularly, as depicted in FIG. 1, the voltage regulation system 5 may include a voltage regulator module (VRM) 10 that furnishes a supply voltage (called $V_{DC}$), a voltage that is communicated to the power consuming circuitry 16 of a particular die 14 via a transmission line 12.

Ideally, the transmission line 12 has zero resistance, inductance and capacitance. However, such characteristics for the transmission line 12 are usually not the case, as the transmission line 12 may be subject to various parasitic elements. For example, there are parasitic impedances such as resistances and inductances that may be introduced to the transmission line 12 through semiconductor package(s), socket/connector(s) and motherboard traces. Furthermore, the transmission line 12 may be subject to various parasitic capacitances due to these same elements, as well as be subject to capacitances that are contributed by coupling capacitors.

Due to these non-ideal effects, it is possible that a voltage drop, or "droop," may occur across the transmission line 12. In this manner, during times of relatively high power demand from the transmission line 12, a significant difference may exist between the $V_{DC}$ voltage at one end of the transmission line 12 and the voltage that appears at the supply voltage pin of the die 14 at the other end of the transmission line 12. For purposes of compensating for a momentary voltage droop, one or more capacitors 13 may be coupled between the transmission line 12 and ground. These capacitors 13 serve as energy storage devices to stabilize the voltage present at the supply voltage pin of the die 14. However, a difficulty with this voltage droop compensation scheme is that the capacitor(s) 13 may be relatively inefficient and introduce significant power losses.

Thus, there is a continuing need for an arrangement that addresses one or more of the problems that are stated above.

DETAILED DESCRIPTION

Figure 1:
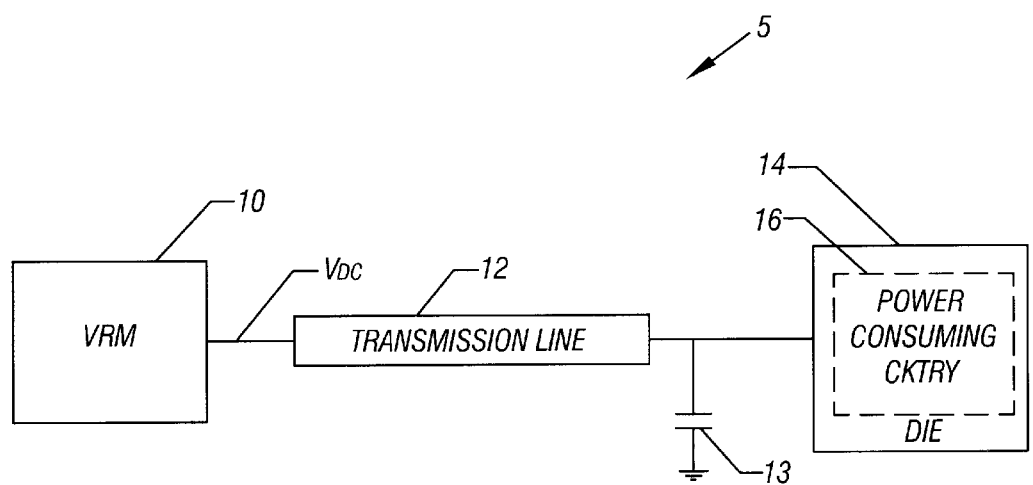
FIG. 1 is a schematic diagram of a supply delivery regulation system of the prior art.
Figure 2:
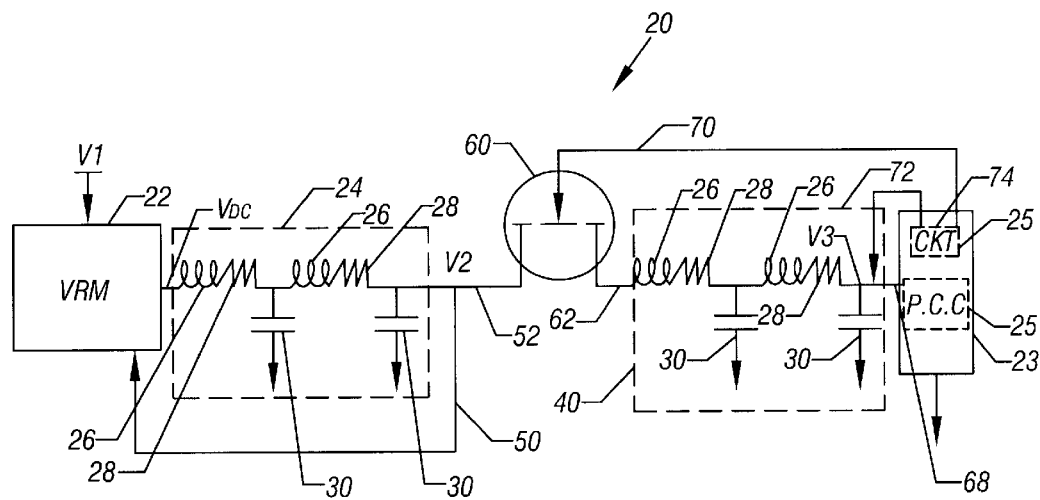
FIGS. 2 and 3 are schematic diagrams of supply voltage regulation systems according to different embodiments of the invention.

Referring to FIG. 2, an embodiment 20 of a supply voltage regulation system in accordance with the invention includes a voltage regulator module (VRM) 22 that receives an input voltage (called $V_1$) and converts the $V_1$ voltage into a regulated output voltage (called $V_{DC}$). The $V_{DC}$ voltage, in turn, is provided to a transmission line for purposes of communicating the $V_{DC}$ supply voltage to power consuming circuitry, such as power consuming circuitry 25 that is fabricated on a die 23. In this manner, the transmission line is coupled between the VRM 22 and a supply voltage pin 68 of a semiconductor package that encases the die 23. As an example, the transmission line may include electrically conductive printed circuit board (PCB) traces, as well as various sections that are routed through one or more connectors and one or more semiconductor packages.

The electrical response of the transmission line may be influenced by various parasitic inductances, resistances and capacitances. For example, a particular section 24 of the transmission line may be viewed as being formed from repeating elements, each of which includes a series combination of an inductor 26 and resistor 28 and a capacitor 30 that is coupled to ground, as can be appreciated those skilled in the art. The transmission. line may be represented by numerous such sections, such as the section 24 and 40 that are depicted in FIG. 2.

It is quite possible that if not for the features described herein, the $V_{DC}$ voltage may be significantly attenuated by the transmission line such that the resultant voltage (called $V_3$) that appears at the supply voltage pin 68 may be at an insufficient level to properly power the power consuming circuitry 25. However, in contrast to conventional arrangements, the supply voltage regulation system 20 includes a junction field-effect-transistor (JFET) 60 that has its drain-source path coupled in series with the transmission line. In some embodiments of the invention, the drain-source path may separate sections of the transmission line. For example, as depicted in FIG. 2, the drain-source path of the JFET 60 is interposed between the transmission line sections 24 and 40.

It is noted that other arrangements are possible. For example, in some embodiments of the invention, the drain-source path of the JFET 60 may be coupled between the end of the transmission line near the supply voltage pin 68 and the power consuming circuitry 25. As yet another example, in some embodiments of the invention, the JFET 60 may be fabricated on the die 23 and form a bridge between the supply voltage pin 68 and the power consuming circuitry 25. Other arrangements are possible.

The JFET 60 serves as an intermediate voltage regulation device for purposes of regulating the $V_3$ voltage that appears at the supply voltage pin 68. More particularly, the gate terminal of the JFET 60 may be coupled to a drive line 70 that extends to a circuit 74 that is fabricated on the die 23. The circuit 74 includes circuitry to drive the JFET 60 as well as circuitry to sense the $V_3$ voltage for purposes of controlling the voltage that appears on the supply voltage pin 68. In this manner, the control circuit 74 senses (via a sense line 72, for example) the $V_3$ voltage and regulates the voltage (on the drive line 70) that appears at the gate terminal of the JFET 60 accordingly. More specifically, the circuit 74 regulates the gate-to-source voltage of the JFET 60 to control the voltage drop across the JFET's drain-source path. By controlling the JFET 60 in this manner, the $V_3$ voltage may be regulated to negate the non-ideal effects of the transmission line and thus, minimize the degree of voltage droop across the transmission line.

In some embodiments of the invention, the VRM 22 has a sense line 50 that is coupled to the drain terminal of JFET 60. In this manner, the VRM 22 senses a voltage (called $V_2$) at the drain terminal of the JFET 60 and regulates its operation accordingly to regulate the $V_2$ voltage. As an example, the VRM 22 may regulate the $V_2$ voltage such that the $V_2$ voltage is slightly larger than the $V_3$ voltage. For example, the VRM 22 may regulate the $V_2$ voltage so that the $V_2$ voltage is a few tenths of a volt above the voltage level of the $V_3$ voltage.

Because the $V_2$ voltage is greater than the $V_3$ voltage, the JFET 60 may be used to selectively introduce a voltage drop across its drain-source path to regulate the $V_3$ voltage at a predetermined level consistent with the nominal supply voltage level that should appear at the pin 68.

The advantages of the using the JFET 60 in the above-described manner may include one or more of the following. The use of the JFET 60 may permit a faster response to a drop in voltage. A tighter control may be maintained on the supply voltage near the supply voltage pin 68. Because the above-described circuitry bypasses the potential impedances that are introduced by a PCB, connector/socket(s) and semiconductor package(s), higher impedances from these contributors may be tolerated. The JFET 60 may provide a higher current density and higher switching speed with greater efficiency than a standard metal-oxide-semiconductor field-effect-transistor (MOSFET), for example. The JFET 60 may consume less power than a standard MOSFET (for example) and be smaller in size than a standard MOSFET, for example. Other and different advantages may be possible.

Figure 3:
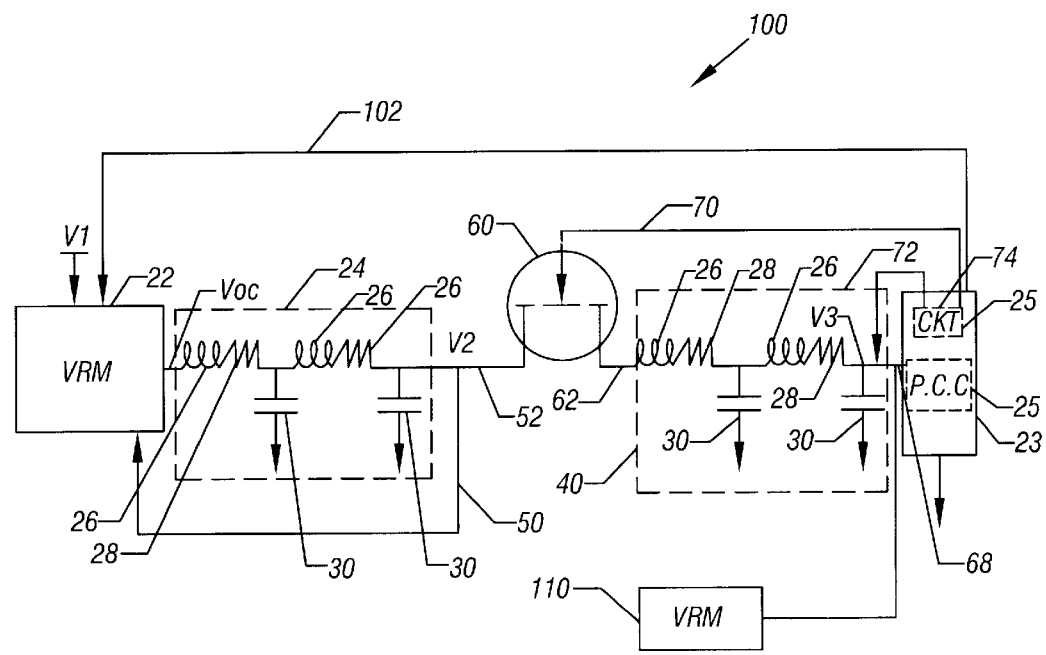

Other embodiments are possible and within the scope of the following claims. For example, FIG. 3 depicts an embodiment 100 of a supply voltage regulation system according to another embodiment of the invention. The system 100 is similar in design to the system 26, 20, with the differences being pointed out below. In particular, unlike the system 20, the supply voltage regulation system 100 includes an additional VRM 110 that is coupled to the supply voltage pin 68 through a conventional transmission line without using a JFET. Also, in the system 100, the circuit 74 controls the voltage on a communication line 102 that extends to an enable input on the VRM 22.

Due to the above-described arrangement, the VRM 110 may, during normal power consumption by the power consuming circuitry 25, be the sole provider of the supply voltage to the supply voltage pin 68. Thus, during normal operation, the circuit 74 disables the VRM 22 (via the communication line 102) so that the VRM 22 neither supplies power nor is the JFET 60 used to regulate the voltage that appears at the supply voltage pin 68.

However, during increased times of power demand by the power consuming circuitry 25, the circuit 74 controls the signal present on the line 102 to enable the VRM 22 to cause the VRM 22 to provide the $V_{DC}$ voltage to the transmission line between the VRM 22 and the die 23. In response to the enablement of the VRM 22, the circuit 74 also controls operation of the JFET 60 as described above. Thus, in these times of increased power demand, the operation of the JFET 60 serves to stabilize the supply voltage at the pin 68, a voltage that may otherwise droop due to the connection of the VRM 110 to the supply voltage pin 68 without any intermediate voltage regulation. Other arrangements are possible.

Various techniques may be used to control the gate-to-source voltage of the JFET 60 to regulate the $V_3$ voltage. In this control, the circuit 74 is used. As noted above, the circuit 74 may include the control and drive circuitry to control the JFET 60 as described below. Depending on the particular embodiment of the invention, both the control and drive circuitry may be located on the die 23 (consistent with the depiction of the circuit 74 in FIGS. 2 and 3) or may be located on separate dies. For example, in some embodiments of the invention, the control circuitry (of the circuit 74) may be located on the die 23, and the drive circuitry (of the circuit 74) may be located on another die. Other variations are possible.

Figure 4:
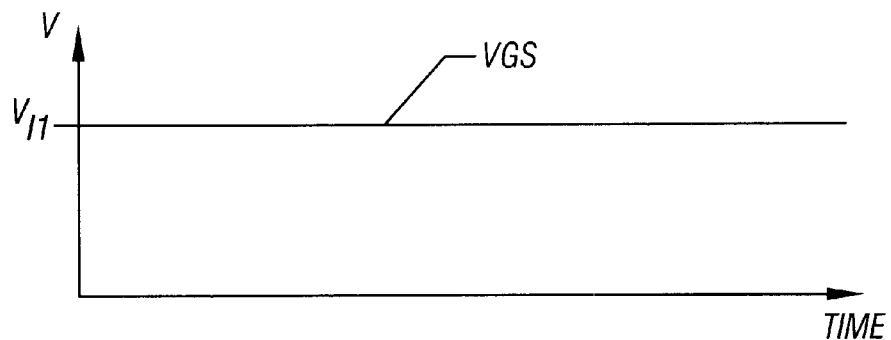
FIGS. 4 and 5 are waveforms of a gate voltage of a transistor of the system of FIGS. 2 and 3 according to different embodiments of the invention.

FIG. 4 depicts a control technique for controlling the gate-to-source voltage of the JFET 60 according to an embodiment of the invention. This technique includes supplying a DC voltage to the gate terminal of the JFET 60 (via the drive line 70) to regulate the gate-to source voltage (called $V_{GS}$ in FIG. 4) of the JFET 60. In this manner, the $V_{GS}$ voltage may be regulated at a voltage level $V_{LI}$ level (as depicted in FIG. 4 as an example) and may be adjusted as needed by the circuit 74 to regulate the $V_3$ voltage at the appropriate level.

Figure 5:
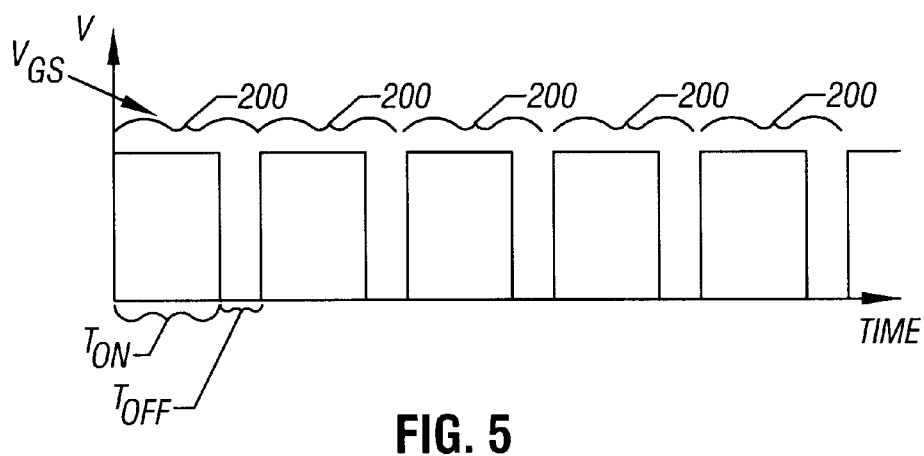

Alternatively, the circuit 74 may drive the gate terminal of the JFET 60 via on and off switching cycles. In this manner, as an example, the circuit 74 may operate the JFET 60 such that the $V_{GS}$ voltage transitions through switching cycles 200 that are depicted in FIG. 5. In some embodiments of this invention, each switching cycle 200 may have the same duration and thus, set the on/off switching frequency of the JFET 60. In each switching cycle, the JFET 60 is switched on (during a time interval called $T_{ON}$) and switched off (during a subsequent off interval called $T_{OFF}$). The ratio of the $T_{ON}$ interval to the duration of the switching cycle 200 is called the duty cycle, a parameter that governs the voltage drop across the drain-source path of the JFET 60. Thus, by regulating the duty cycle, the circuit 74 may regulate the $V_3$ voltage.

Figure 6:
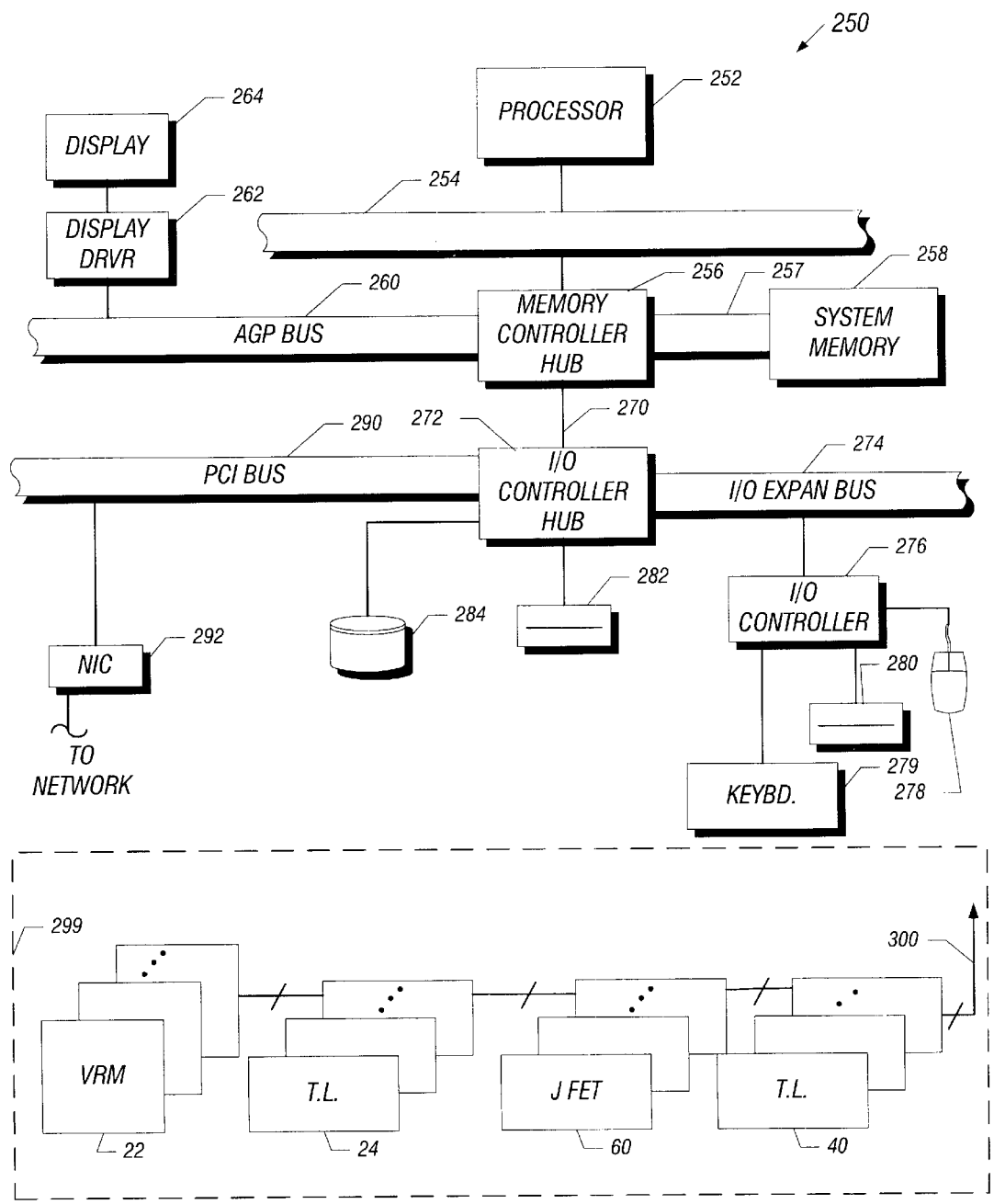
FIG. 6 is a schematic diagram of a computer system according to an embodiment of the invention.

The above-described supply voltage regulation systems 20 and 100 are described in terms of a single VRM 22, a single transmission line, a single JFET 60 and a single die 23. However, referring to FIG. 6, a system, such as a computer system 250 (for example), may have multiple VRMs 22, transmission lines, JFETs 60 and dies 23 that receive power from the VRMs 22. Thus, there are numerous configurations that utilize the JFETs 60 to regulate the supply voltages at various particular dies 23 of the computer system 250.

For example, these dies 23 may form the various components of the computer system 250. Such components include, for example, a processor 252 (a microprocessor or multiple microprocessors, for example) that is coupled to a system bus 254. Also coupled to the system bus 254 is a north bridge, or memory controller hub 256. The memory controller hub 256 serves as an interface between a system memory bus 257, an Accelerated Graphics Port (AGP) bus 260 and a hub communication interface 270. The AGP is described in detail in the Accelerated Graphics Port Interface Specification, Revision 1.0, published on Jul. 31, 1996, by Intel Corporation of Santa Clara, Calif. The system memory bus 257 is coupled to a system memory 258, and the hub interface 270 establishes communication between the memory controller hub 256 and a south bridge, or input/output (I/O) controller hub 272. The AGP bus 260 is coupled to a display driver 262 that provides signals to drive a display 264.

The I/O controller hub 252 provides an interface between the hub interface 270, a Peripheral Component Interconnect (PCI) bus 290 and an I/O expansion bus 274. The PCI Specification is available from The PCI Special Interest Group, Portland, Oreg. 97214. The I/O controller hub 272, besides providing these interfaces, may control operation of a hard disk drive 284 and a CD-ROM drive 282. The PCI bus 290 may be interfaced to, for example, a network interface card (NIC) 292 that interfaces the computer system 250 to a network, for example.

The I/O expansion bus 274 may be coupled to an I/O controller 276, for example. The I/O controller 276 may, for example, receive input from a keyboard 279 and a mouse 278, as well as control operation of a floppy disk drive 280. Other arrangements and variations are possible for the computer system 250.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. A system comprising:
   a junction-field-effect transistor;
   a transmission line coupled to the transistor to communicate a supply voltage from a first end of the transmission line to a first circuit located near a second end of the transmission line; and
   a second circuit to control operation of the transistor to regulate a degree of decrease in the supply voltage between the first end and the first circuit.

2. The system of claim 1, wherein:
   the transistor has a drain-source path coupled in series with the transmission line.

3. The system of claim 2, wherein:
   the transmission line has a first section between the drain-source path of the transistor and the first end and a second section between the drain-source path and the second circuit.

4. The system of claim 2, wherein:
   the drain-source path of the transistor is coupled between the second end and the first circuit.

5. The system of claim 1, wherein:
   the transistor is fabricated on a die.

6. The system of claim 1, wherein:
   the second circuit operates the transistor via switching cycles to regulate the degree of decrease in the supply voltage.

7. The system of claim 1, wherein:
   the second circuit applies a DC voltage to a gate terminal of the transistor to regulate the degree of decrease in the supply voltage.

8. A system comprising:
   a first circuit comprising power consuming circuitry;
   a voltage regulator to furnish a supply voltage;
   a junction-field-effect transistor;
   a transmission line coupled to the transistor to communicate the supply voltage from a first end of the transmission line to the first circuit located near a second end of the transmission line; and
   a second circuit to control operation of the transistor to regulate a degree of decrease in the supply voltage between the first end and the first circuit.

9. The system of claim 8, wherein:
   the transistor has a drain-source path coupled in series with the transmission line.

10. The system of claim 9, wherein:
    the transmission line has a first section between the drain-source path of the transistor and the first end and a second section between the drain-source path and the second circuit.

11. The system of claim 9, wherein:
    the drain-source path of the transistor is coupled between the second end and the first circuit.

12. The system of claim 8, wherein:
    the transistor is fabricated on a die.

13. The system of claim 8, wherein:
    the second circuit operates the transistor via switching cycles to regulate the degree of decrease in the supply voltage.

14. The system of claim 8, wherein:
    the second circuit applies a DC voltage to a gate terminal of the transistor to regulate the degree of decrease in the supply voltage.

15. A method comprising:
    providing a transmission line to communicate a supply voltage from a first end of the transmission line to a first circuit located near a second end of the transmission line;
    coupling a junction-field-effect transistor to the transmission line; and controlling the operation of the transistor to regulate the degree of decrease in the supply voltage between the first end of the transmission line and the first circuit.

16. The method of claim 15, wherein the coupling comprises:
    coupling a drain-source path of the transistor in series with the transmission line.

17. The method of claim 16, wherein the coupling comprises:
    coupling the drain-source path to the transmission line such that the transmission line has a first section between the drain-source path and the first end and a second section between the drain-source path and the circuit.

18. The method of claim 15, wherein the coupling comprises:
    coupling the drain source path to the transmission line between the second end of the transmission and the first circuit.

19. The method of claim 15, further comprising:
    fabricating the transistor on a die.

20. The method of claim 15, wherein the controlling comprises:
    operating the transistor via switching cycles to regulate the degree of decrease in the supply voltage.

21. The method of claim 15, wherein the regulating comprises:
    regulating operation of the transistor via a DC voltage to regulate the degree of decrease in the supply voltage.

* * * * *